A. MILLER.
MUZZLE.

No. 172,468. Patented Jan. 18, 1876.

WITNESSES:
C. Neveux
Alex F. Roberts

INVENTOR:
A. Miller
BY
Munn & Co.
ATTORNEYS.

UNITED STATES PATENT OFFICE.

AUGUST MILLER, OF SALINA, KANSAS.

IMPROVEMENT IN MUZZLES.

Specification forming part of Letters Patent No. 172,468, dated January 18, 1876; application filed December 4, 1875.

*To all whom it may concern:*

Figure 1:
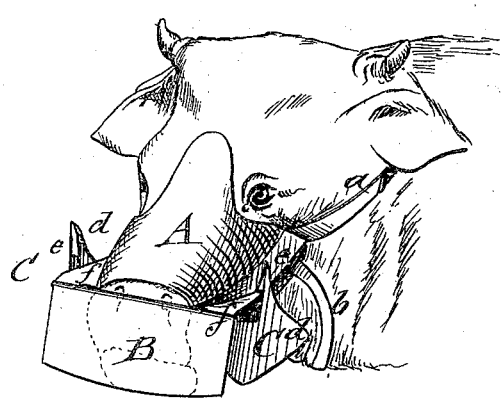
Figure 2:
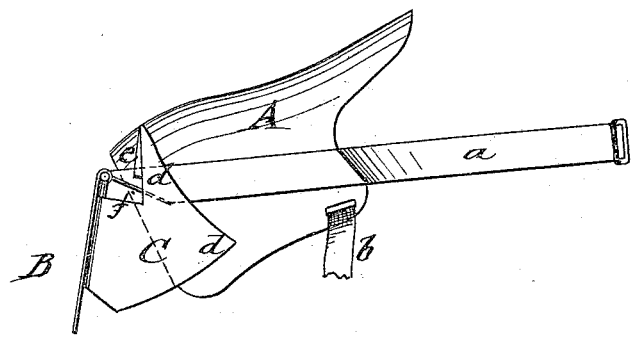

Be it known that I, AUGUST MILLER, of Salina, in the county of Saline and State of Kansas, have invented a new and Improved Calf-Muzzle, of which the following is a specification:

In the accompanying drawing, Figure 1 represents a perspective view of my improved calf-muzzle as applied to the head of a calf, and Fig. 2 is a sectional side view of the same detached.

Similar letters of reference indicate corresponding parts.

The object of my invention is to provide an improved muzzle for calves, by which they can be effectively prevented from sucking the cows when in the same inclosure with them, without being hindered from grazing or getting other food. The muzzle may also be used for dogs and other animals with advantage.

The invention consists of a full-top muzzle-frame with a swinging front plate, having hinged and spurred side plates, the whole being attached to the head by suitable fastening-straps. The swinging side plates have inward-projecting catches, that bear on the top frame, and prevent the front and side boards from swinging away from the mouth.

In the drawing, A represents a rigid frame, made of a solid or full-top part, of zinc or other material, that is fitted on the nose of the calf or other animal to protect the same against getting chafed or sore. The top plate is applied to the head of the calf, and fastened thereto by a flexible head-strap, $a$, and a lower jaw-strap, $b$. A swinging guard-plate, B, is hinged to the front edge of the full-top frame A, and made of such a size that it extends fully across the front of the mouth. The guard-plate may be made of segmental, oblong, or other shape, and has at both sides hinged plates or boards C, with projecting spur-shaped rear and top extensions $d$, that serve to hurt the cow when the calf attempts to suck, so that it is driven off and prevented from taking hold of the teat in a very reliable manner. The front and side guard-plates close over the mouth on the upward motion of the calf's head, but do not interfere with the grazing or other feeding when the head is in downward position, as the plates swing away from the nose and admit the free use of the mouth. The side plates C are provided at the top spur $d$ with inwardly-projecting catches $e$, that engage the side flanges $f$ of the top frame when the calf turns one side up to get the teat into the corner of the mouth. The side plate is thereby locked to the frame and shuts out the teat, securing at the same time the position of the front guard-plate, so that the same cannot be swung higher by the jerks of the animal's head when trying to get the teat.

The muzzle operates thus in twofold manner as a preventive to sucking—first, by the spurs, and then by the locking of the side plates.

Having thus described my invention, I claim as new and desire to secure by Letters Patent—

1. A muzzle for preventing calves and other animals from sucking, composed of a muzzle-frame, which is strapped to the head, and provided with a swinging front guard-plate, having hinged side plates with projecting top and rear spurs, substantially in the manner and for the purpose set forth.

2. A solid or full-top muzzle-frame, adapted to fit the top of the nose of the animal to prevent chafing, substantially as set forth.

3. The combination of the swinging side guard-plates, having inwardly-projecting catches, with the side flanges of the muzzle-frame and the swinging front plate, for the purpose of locking the parts together sidewise of the mouth, to prevent the animal from getting at the teat, substantially as described.

AUGUST MILLER.

Witnesses:
JOHN FOSTER,
C. W. BANKS.